D. P. GOSLINE.
PROCESS OF CONDITIONING AIR.
APPLICATION FILED MAR. 11, 1909.
1,155,308. Patented Sept. 28, 1915.
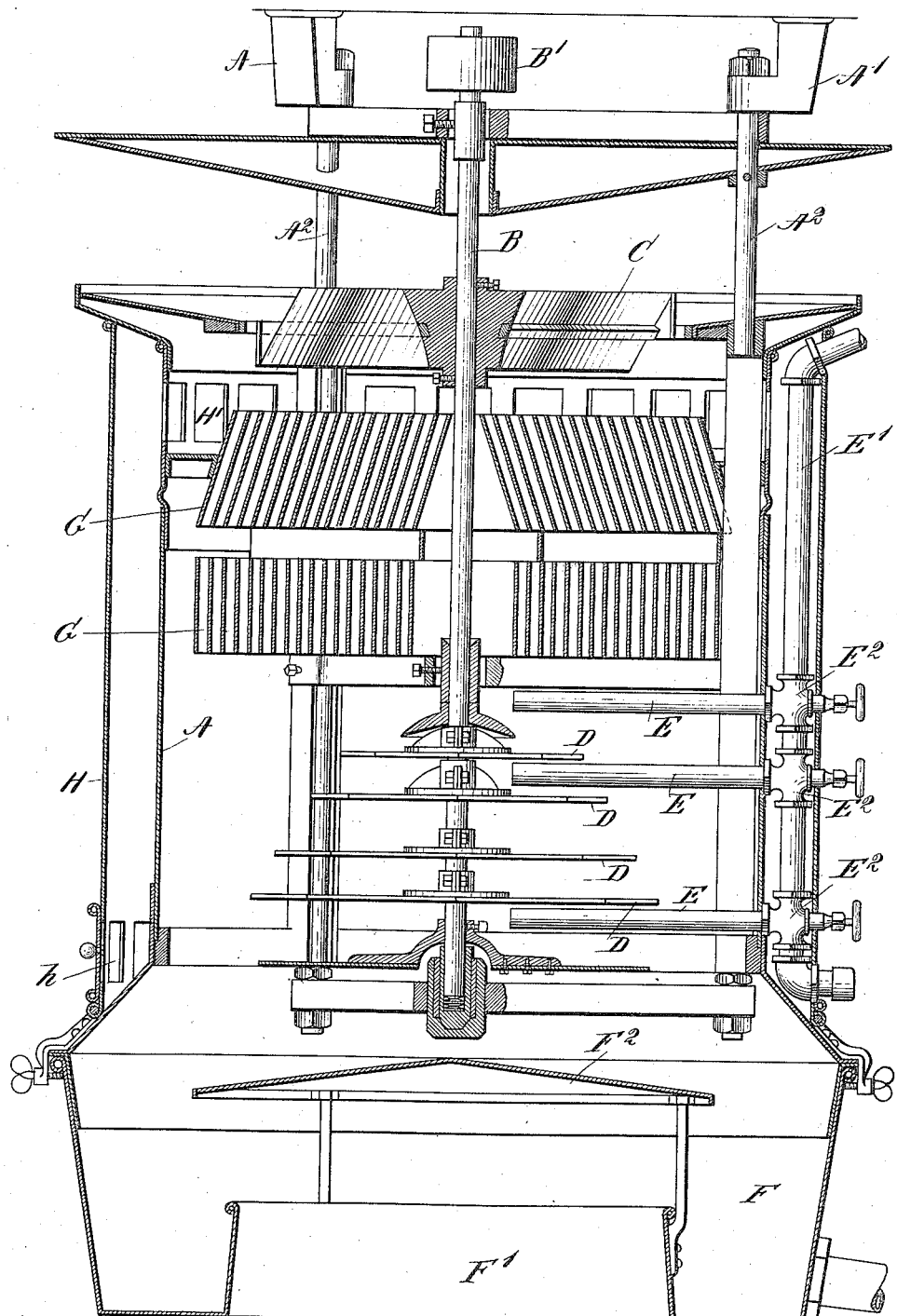

UNITED STATES PATENT OFFICE.

DANIEL P. GOSLINE, OF BOSTON, MASSACHUSETTS.

PROCESS OF CONDITIONING AIR.

1,155,308.     Specification of Letters Patent.     Patented Sept. 28, 1915.

Application filed March 11, 1909. Serial No. 482,703.

*To all whom it may concern:*

Be it known that I, DANIEL P. GOSLINE, of Boston, in the county of Suffolk and State of Massachusetts, a subject of His Majesty King Edward VII, have invented a new and useful Improvement in Processes of Conditioning Air, of which the following is a specification.

My invention relates to a process of conditioning air, that is, to a process for changing its condition both as to temperature and humidity, and at the same time purifying it. Many devices have been constructed to accomplish such purpose but in their operation all have shown defects for the reason, as I believe, that they have not been based upon a thorough understanding of the fundamental methods necessary for accomplishing this purpose. The varying faulty conditions of air as found in factories, foundries, storerooms, and the like, are well known and it is self-evident that these conditions cannot be changed by the introduction of atmospheric air alone, as such air is seldom if ever free from dust or other impurities, and moreover, is varying in its character both as to temperature and as to moisture. The difficulties with processes heretofore used for the purpose of conditioning air have resulted from several causes among which is a faulty atomizing of the liquid combined with a faulty delivery of such atomized liquid into the air. Too much stress also has been laid upon the desire to change the air of the room quickly and hence to drive the air by a blast into the room. I have found by experience that a blast of air is undesirable for the reason that if the air is moved too quickly it does not absorb sufficient moisture, or rather, is not sufficiently brought in contact with the atomized liquid to be thoroughly conditioned thereby. Moreover, to accomplish this same conditioning the atomized liquid must be driven sharply into the air so that the slowly moving air must come in contact with it. It is not sufficient that the air and liquid shall move in the same direction, nor is it sufficient that the air shall be driven in contact with the liquid in the same general direction therewith, nor that the air shall be driven through a mist under circumstances where the speed of the air is rapid and the mist has no energy.

My invention therefore is based upon the principle, first, that air holds moisture with relation to its temperature, and second, that velocity is also a determining factor in controlling the proper conditioning of air, thus air at rest at a given temperature will carry a certain amount of moisture in suspension and precipitation will occur if such air is set in rapid motion even though the same temperature is maintained. This is one reason why, as stated above, in carrying out my process the air moves at a slow rate of speed as compared with liquid. By this means no portion of the volume of air escapes the action of the liquid. The air is the passive and slowly moving element to be acted upon, the liquid being the aggressor under the control of the operator to accomplish the results for any particular work.

In carrying out my process I proceed as follows: The air to be conditioned is introduced into a duct or machine and water or a chilling fluid capable of carrying a very low temperature brought in violent contact with it. The water or chilling fluid being introduced into the duct or machine is broken up and completely atomized and thrown violently into the air preferably by centrifugal action while the air is moving slowly through said duct or chamber. The lines of travel of the air and of the atomized liquid are best at practically right angles to each other so that the air is struck in its passage by the atomized liquid which is violently driven in its atomized form into its very midst so that thorough contact results. Air so treated acquires more surely and quickly the temperature of the liquid used because of the impact between the liquid and the moving air, and, because of the slow passage, sufficient time is given the air to become well and thoroughly conditioned. It necessarily carries the maximum amount of moisture possible at such temperatures, and rejects any surplus which, were it moving under high velocity might be carried off bodily with it. At the same time all dirt, dust or foreign matter in the air is eliminated and thrown down by the process because of the violent action of the agency employed.

Air passing through a chamber in which a liquid agent is so used causes an amount of evaporation and consequent cooling which is impossible to obtain by any other process. The slower the velocity and the more violent the impact of atomized liquid the greater the evaporation and consequent cooling, and the more certain conditioning of the air introduced. This is directly the opposite of all other methods known to me. They depend upon a high velocity of air and a comparatively slow movement of water in connection with the stationary plates.

The process which I have described can be secured and effectively operated by the simplest kind of mechanism, such as is shown in the drawing and may be wrought into a single machine or may be incorporated in an air duct as may be desired.

If necessary a controllable quantity of atmospheric or other air may be mixed with the conditioned air to slightly change its character. The condition of the air may always be known by the use of well known scientific instruments for the purpose.

I have shown in the drawing filed herewith a form of apparatus substantially like that described in Letters Patent of the United States, No. 916,146, granted to me March 23, 1909. It will only be necessary to describe this apparatus generally as a full description is given in the said Letters Patent. Briefly speaking it comprises a cylinder A within which is supported a shaft B carrying near its upper end a fan C by which a draft will be caused through the duct formed by the cylinder. The fan need not be powerful as it is only intended to cause such a draft as will result in a thorough distribution of air from the machine. In other words, its function relates to the distribution of air from the machine rather than to the passage of air through the machine. This shaft B has a suitable pulley $B^1$ by which the shaft is rotated and the cylinder A is supported, for example, from suitable brackets $A^1$ by rods $A^2$ as shown. On the shaft B are plates D, and arranged to distribute water upon the plates are pipes E leading from a standpipe $E^1$ and controlled by suitable valves $E^2$. A pan F having a central opening $F^1$ forms the bottom of the cylinder A and receives the liquid which is not taken up by the air. The central opening $F^1$ provides an inlet for air and is covered by a hood $F^2$ located to allow the free inlet of air and at the same time prevent the drippings from passing out through the opening. Baffle plates are provided at G to strip the air of any moisture which has not been absorbed by it. An outer cylinder or casing H is also provided which has openings $h$ which may be covered by dampers so that air may be drawn in through these openings and pass out through other openings $H^1$ in the top of the cylinder H into the duct, this being one means of providing for the further change in the condition of the air, as for example, by mingling with it a hot dry air to further warm it. A change of temperature of the conditioned air without changing its humidity may further be made by passing it over hot dry surfaces or in like ways.

In practice the shaft is caused to rotate carrying with it the disks and other parts connected with it by which the liquid is broken up as described in my said Letters Patent, the liquid being fed to it from one or more of the pipes E as occasion may require. The liquid is thrown from the edges of the disks or plates D in planes or sheets transverse to the direction of movement of the air, said air passing relatively slowly through said planes or sheets, which cut the current of air and cause the liquid to be forced violently into contact therewith. Also, the liquid on the surfaces of the disks, and even beyond the edges thereof, is spread out into thin, rapidly moving films, in which condition the evaporation of said liquid is greatly accelerated, thereby increasing the moistening as well as the cooling effect. The shaft also causes the revolution of the fan so that the air within the duct is distributed in such manner as occasion may require.

My purpose, while it may be carried out by this machine, may also be carried out in other ways as will be easily understood. It consists of the passing of a slowly moving body of air at approximately atmospheric temperature through a duct into which shall be projected a freely atomized and violent moving liquid of such temperature as shall be required by the work to be done. The air is delivered by the fan to its point of use. By changing the temperature of the liquid the temperature of the air will be changed and it will take up only so much moisture as it can absorb at that temperature. If it already contains a high degree of moisture and it is chilled, that is to say, the liquid is supplied at a low temperature it will drop a portion of its moisture. Assuming for example that a liquid having a temperature of 10 degrees Fahr. above zero is used, air by contact with such liquid refrigerant is reduced to the same temperature, and at that temperature can carry only about one grain of moisture per one cubic foot. Air taken from a room or out of doors if treated by my process and delivered at such temperature and humidity into a room where a temperature of about freezing point is required would provide an atmosphere whose relative humidity would not exceed 30%, and this is from 25% to 35% lower than is usually found in present practice. Assuming on the other hand that excessive humidity is desired as in some branches of textile work, air from the room or outside is brought in contact with atomized liquid preferably of a higher temperature. Thus, to produce and maintain a 75% relative humidity, use liquid having a temperature varying from 80 to 150 degrees (in extreme cases where excessive moisture is required use the higher temperature) and bring the air from said room slowly through the machine or duct in which said liquid is atomized in the violent manner described. Air at 80 degrees will carry at least 10 grains of moisture per cubic foot, and will be fully saturated in passing and the stipulated condition will be secured by so treating a sufficient volume of air. The liquid will supply the moisture required or carry off any excess of moisture should the volume of air supplied be of higher moisture carrying capacity. These extreme cases serve to illustrate my process, a correct application of which will secure properly conditioned air for all refrigerating, mechanical or manufacturing purposes, and also provide the best hygienic conditions for school-rooms, auditoriums, theaters, dwellings, etc., since in process the air is not only conditioned but is thoroughly washed and cleansed of all dust or foreign matter and the air delivered clean and with a predetermined temperature and moisture. Each case brings its own problems but all may be solved by the same process. The above results have actually been secured and have depended entirely upon the correct use of the principles herein set forth.

It is of course clear that the atomized liquid will wash the air at the same time that the process of conditioning goes on, cleaning it from all dust, dirt, lint, and other impurities which it may contain.

What I claim as my invention is:

That process of conditioning air which consists in submitting the air, while moving at a relatively low velocity, to the cutting and wiping action of a series of rapidly moving wetted surfaces and the impacting action of independently variable sprays of water, said surfaces and sprays both treating the air, in passage, at right angles to its line of travel; whereby a predetermined quantity of atomized liquid will be mingled with and absorbed by the air.

DANIEL P. GOSLINE.

Witnesses:
 M. E. FLAHERTY,
 W. P. O'BRIEN.